US012617514B1

(12) United States Patent
Baer et al.

(10) Patent No.: US 12,617,514 B1
(45) Date of Patent: May 5, 2026

(54) PROPULSION SYSTEMS AND METHODS FOR CONTROLLING ELECTRIC MARINE DRIVES FOR A MARINE VESSEL

(71) Applicant: Brunswick Corporation, Mettawa, IL (US)

(72) Inventors: Mitchell J. Baer, Fond Du Lac, WI (US); Jared D. Kalnins, Neenah, WI (US); Robert R. Osthelder, Omro, WI (US); Daniel A. Roske, Milford, NH (US)

(73) Assignee: Brunswick Corporation, Mettawa, IL (US)

( * ) Notice: Subject to any disclaimer, the term of this patent is extended or adjusted under 35 U.S.C. 154(b) by 153 days.

(21) Appl. No.: 18/502,823

(22) Filed: Nov. 6, 2023

(51) Int. Cl.
*B63H 25/04* (2006.01)
*B60L 15/20* (2006.01)
*B63H 21/21* (2006.01)

(52) U.S. Cl.
CPC .............. *B63H 21/21* (2013.01); *B60L 15/20* (2013.01); *B63H 25/04* (2013.01); *B60L 2200/32* (2013.01); *B60L 2240/12* (2013.01); *B60L 2240/421* (2013.01); *B60L 2240/423* (2013.01); *B60L 2240/429* (2013.01); *B60L 2240/54* (2013.01); *B60L 2250/00* (2013.01); *B63H 2021/216* (2013.01)

(58) Field of Classification Search
CPC .. B63H 21/21; B63H 25/04; B63H 2021/216; B60L 15/20; B60L 2200/32; B60L 2240/12; B60L 2240/421; B60L 2240/423; B60L 2240/429; B60L 2240/54; B60L 2250/00
See application file for complete search history.

(56) References Cited

U.S. PATENT DOCUMENTS

| | | | |
|---|---|---|---|
| 7,416,456 B1 | 8/2008 | Gonring et al. | |
| 9,290,252 B1 | 3/2016 | Tuchscherer et al. | |
| 9,745,036 B2 | 8/2017 | Andrasko et al. | |
| 9,777,655 B1 | 10/2017 | Arbuckle et al. | |
| 10,167,798 B1 | 1/2019 | Van Camp et al. | |
| 11,414,167 B1 | 8/2022 | Przybyl et al. | |
| 2022/0194542 A1 | 6/2022 | Kirchhoff et al. | |
| 2023/0219675 A1 | 7/2023 | Janeczko et al. | |
| 2023/0219676 A1 | 7/2023 | Kalnins et al. | |
| 2024/0159833 A1* | 5/2024 | Baer ................... | G01R 31/371 |

OTHER PUBLICATIONS

Roa, Application of classification rules to hybrid marine electrical propulsion plants, 2015, IEEE, p. 1-7 (Year: 2015).*

(Continued)

*Primary Examiner* — McDieunel Marc

(74) *Attorney, Agent, or Firm* — Andrus Intellectual Property Law, LLP

(57) ABSTRACT

A method of controlling at least one battery-powered electric marine drive configured to propel a planing marine vessel includes receiving a control command to engage an efficiency control mode configured to provide propulsion efficiency of the electric marine drive at a planing speed of the marine vessel, comparing at least one propulsion output value for the electric marine drive to at least one battery range optimization value indicating optimized propulsion output efficiency, and generating a range optimization action based on the comparison.

22 Claims, 6 Drawing Sheets

(56)  References Cited

OTHER PUBLICATIONS

Capasso et al., Preliminary design of the hybrid propulsion architecture for the research vessel "G. Dallaporta", 2016, IEEE, pg., (Year: 2016).*

Leo et al., Unmanned Autonomous Surface Vehicle for the Shallow Water Bathymetry Applications, 2022, IEEE, p. 1-7 (Year: 2022).*

Veneri et al. Evolution and Development Prospects of Electric Propulsion Systems of Large Sea Ships, 2020, IEEE, p. 1-6 (Year: 2020).*

* cited by examiner

405

RECEIVE A CONTROL COMMAND TO ENGAGE AN EFFICIENCY CONTROL MODE

410

COMPARE AT LEAST ONE PROPULSION OUTPUT VALUE TO AT LEAST ONE BATTERY RANGE OPTIMIZATION VALUE

415

GENERATE A RANGE OPTIMIZATION ACTION BASED ON THE COMPARISON

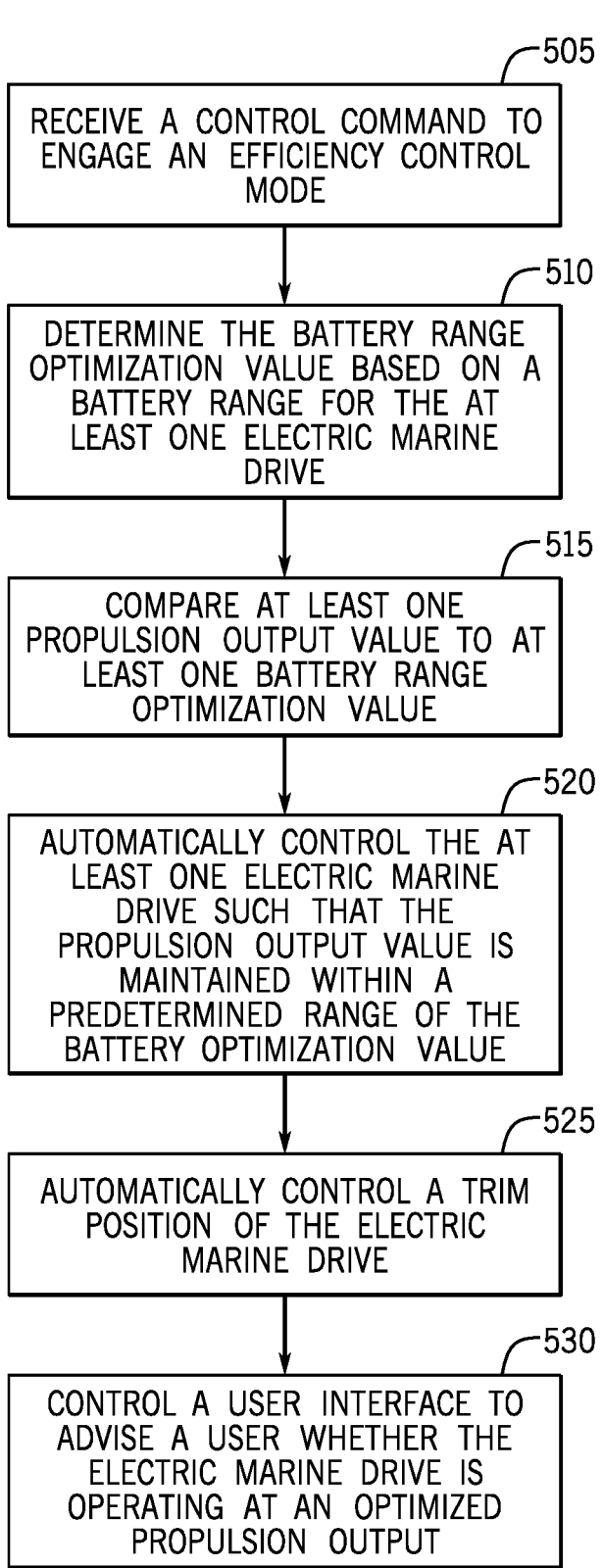

505

RECEIVE A CONTROL COMMAND TO ENGAGE AN EFFICIENCY CONTROL MODE

510

DETERMINE THE BATTERY RANGE OPTIMIZATION VALUE BASED ON A BATTERY RANGE FOR THE AT LEAST ONE ELECTRIC MARINE DRIVE

515

COMPARE AT LEAST ONE PROPULSION OUTPUT VALUE TO AT LEAST ONE BATTERY RANGE OPTIMIZATION VALUE

520

AUTOMATICALLY CONTROL THE AT LEAST ONE ELECTRIC MARINE DRIVE SUCH THAT THE PROPULSION OUTPUT VALUE IS MAINTAINED WITHIN A PREDETERMINED RANGE OF THE BATTERY OPTIMIZATION VALUE

525

AUTOMATICALLY CONTROL A TRIM POSITION OF THE ELECTRIC MARINE DRIVE

530

CONTROL A USER INTERFACE TO ADVISE A USER WHETHER THE ELECTRIC MARINE DRIVE IS OPERATING AT AN OPTIMIZED PROPULSION OUTPUT

RECEIVE A CONTROL COMMAND TO ENGAGE AN EFFICIENCY CONTROL MODE

610

DETERMINE THE BATTERY RANGE AT A PLURALITY OF PROPULSION OUTPUTS

615

DETERMINE THE MINIMUM SUSTAINABLE PLANING SPEED

620

DETERMINE THE BATTERY RANGE OPTIMIZATION VALUE BASED ON THE BATTERY RANGE AT A PLURALITY OF PROPULSION OUTPUTS AND THE MINIMUM SUSTAINABLE PLANING SPEED

PROPULSION SYSTEMS AND METHODS FOR CONTROLLING ELECTRIC MARINE DRIVES FOR A MARINE VESSEL

FIELD

The present disclosure generally relates to systems and methods for controlling at least one battery-powered electric marine drive configured to propel a planing marine vessel.

BACKGROUND

The following U.S. Patents and publications provide background information and are incorporated herein by reference, each in its entirety:

U.S. Pat. No. 7,416,456 discloses an automatic trim control system that changes the trim angle of a marine propulsion device as a function of the speed of the marine vessel relative to the water in which it is operated. The changing of the trim angle occurs between first and second speed magnitudes which operate as minimum and maximum speed thresholds.

U.S. Pat. No. 9,745,036 discloses a trim control system that automatically controls trim angle of a marine propulsion device with respect to a vessel. A memory stores trim base profiles, each defining a unique relationship between vessel speed and trim angle. An input device allows selection of a base profile to specify an aggressiveness of trim angle versus vessel speed, and then optionally to further refine the aggressiveness. A controller then determines a setpoint trim angle based on a measured vessel speed. If the user has not chosen to refine the aggressiveness, the controller determines the setpoint trim angle from the selected base profile. However, if the user has chosen to refine the aggressiveness, the controller determines the setpoint trim angle from a trim sub-profile, which defines a variant of the relationship between vessel speed and trim angle defined by the selected base profile. The control system positions the propulsion device at the setpoint trim angle.

U.S. Pat. No. 10,167,798 discloses a method for controlling acceleration of a marine vessel having at least one engine that includes receiving a ramp value and an overshoot value, and then determining an acceleration curve based on the ramp value and the overshoot value, wherein the acceleration curve visually represents engine RPM values or vessel speed values over time for accelerating a marine vessel from idle to a desired cruising speed. A graph is then displayed containing the acceleration illustration curve on a user interface display, wherein the graph visually correlates the ramp value and the overshoot value to the acceleration illustration curve. A user input is then received adjusting the ramp value and/or the overshoot value, and the acceleration illustration curve is then redetermined based on the adjusted ramp value and the adjusted overshoot value, and the graph is updated to reflect the new acceleration illustration curve.

U.S. Pat. No. 11,414,167 discloses a method for controlling marine vessel speed that includes determining a setpoint vessel speed, which is constant while the system is operating in a cruise control mode. The method includes using vessel speed feedback control to adjust operational characteristics of the engine so as to achieve the setpoint vessel speed. The method also includes determining a measured vessel speed and filtering the measured vessel speed. In response to determining that the measured vessel speed is within a given range of the constant setpoint vessel speed, the method includes transitioning to the cruise control mode and comparing the filtered measured vessel speed to the constant setpoint vessel speed for purposes of the feedback control.

U.S. Patent No. 2022/0194542 discloses a method of controlling an electric marine propulsion system configured to propel a marine vessel including measuring at least one parameter of an electric motor in the electric marine propulsion system and determining that the parameter measurement indicates an abnormality in the electric marine propulsion system. A reduced operation limit is then determined based on the at least one parameter measurement, wherein the reduced operation limit includes at least one of a torque limit, an RPM limit, a current limit, and a power limit. The electric motor is then controlled such that the reduced operation limit is not exceeded.

U.S. Patent No. 2023/0219675 discloses a method of controlling an electric marine propulsion system to propel a marine vessel includes receiving a user-set time, determining a time remaining based on the user-set time, and identifying a battery charge level of a power storage system on the marine vessel. A required battery power is then determined based on the time remain-ing and the battery charge level, and then an output limit is determined based on the required battery power to enable propelling the marine vessel for the user-set time without recharging the power storage system. The propulsion system is automatically controlled so as not to exceed the output limit.

U.S. Patent No. 2023/0219676 discloses a method of controlling an electric marine propulsion system configured to propel a marine vessel includes receiving a user-set distance, identifying a battery charge level of a power storage system on a marine vessel and identifying an energy utilization value. An output limit is then determined based on a remaining distance, the battery charge level, and the energy utilization value. The propulsion system is then automatically controlled so as to not exceed the output limit, enabling the marine vessel to travel the user-set distance without recharging the power storage system.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one aspect of the disclosure, a method of controlling at least one battery-powered electric marine drive configured to propel a planing marine vessel includes receiving a control command to engage an efficiency control mode configured to provide propulsion efficiency of the electric marine drive at a planing speed of the marine vessel, comparing at least one propulsion output value for the electric marine drive to at least one battery range optimization value indicating optimized propulsion output efficiency, and generating a range optimization action based on the comparison.

In one embodiment, the control command to engage the efficiency control mode is a user input. The range optimization action includes automatically adjusting propulsion output of the electric marine drive based on the comparison to the battery range optimization value.

In another embodiment, the efficiency control mode is engaged based on user input. Optionally, the user input includes placing a throttle lever associated with the electric marine drive at a wide-open-throttle position.

In another embodiment, the at least one propulsion output value and the at least one battery range optimization value each include a vessel speed, a motor rpm, a motor current, and/or a motor torque.

In another embodiment, the method includes, prior to comparing the at least one propulsion output value to the at least one battery range optimization value, determining the battery range optimization value based on a battery range for the at least one electric marine drive at a plurality of propulsion outputs.

In another embodiment, generating the range optimization action includes automatically controlling the electric marine drive such that the propulsion output value is maintained within a predetermined range of the battery range optimization value.

In another embodiment, generating the range optimization action includes maintaining the propulsion output value within the predetermined range of the battery range optimization value until user input is received to disengage the efficiency control mode.

In another embodiment, when in the efficiency control mode, a control system is configured to automatically control the electric marine drive to maintain the vessel at a minimum sustainable planing speed for the planing marine vessel.

In another embodiment, generating the range optimization action includes automatically controlling a trim position of the electric marine drive to provide propulsion efficiency of the electric marine drive at the planing speed of the marine vessel. In another embodiment, controlling the trim position of the electric marine drive includes automatically controlling a trim actuator to move the electric marine drive to a predetermined trim position once the marine vessel is on plane.

In another embodiment, generating the range optimization action includes controlling a user interface to advise a user whether the electric marine drive is operating at an optimized propulsion output.

In another aspect of the disclosure, an electric marine drive control system for a marine vessel includes a control system configured to receive a control command to engage an efficiency control mode configured to provide propulsion efficiency of the electric marine drive at a planning speed of the marine vessel, compare at least one propulsion output value for the electric marine drive to at least one battery range optimization value indicating optimized propulsion output efficiency, and generate a range optimization action based on the comparison.

In one embodiment, the at least one propulsion output value and the at least one battery range optimization value each include a vessel speed, a motor rpm, a motor current, and/or a motor torque.

In another embodiment, the battery range optimization value includes a vessel speed, a motor rpm, a motor current, and/or a motor torque that produces a greatest battery range value for the electric marine drive propelling the planing marine vessel.

In another embodiment, the control system is further configured to, prior to comparing the at least one propulsion output value to the at least one battery range optimization value, determine the battery range optimization value based on a battery range for the at least one electric marine drive at a plurality of propulsion outputs.

In another embodiment, the control system is configured to, when generating the range optimization action, automatically control the electric marine drive such that the propulsion output value is maintained within a predetermined range of the battery range optimization value.

In another embodiment, the control system is configured to, when generating the range optimization action, maintain the propulsion output value within the predetermined range of the battery range optimization value until user input is received to disengage the efficiency control mode. In another embodiment, in the efficiency control mode, the control system is configured to automatically control the electric marine drive to maintain the vessel at a minimum sustainable planing speed for the planing marine vessel.

In another embodiment, the control system is configured to, when generating the range optimization action, automatically control a trim position of the electric marine drive to provide propulsion efficiency of the electric marine drive at the planing speed of the marine vessel. In another embodiment, the control system is configured to, when controlling the trim position of the electric marine drive, automatically control a trim actuator to move the electric marine drive to a predetermined trim position once the marine vessel is on plane. In another embodiment, the display on the user interface may display the trim point, trim angle, and engine RPM and when the control system determines the current trim point, trim angle, and/or RPM are within a predetermined RPM and/or trim threshold, the display may turn the screen green versus red, as an example, to indicate to the operator that the current propulsion output value is within the battery/propulsion range associated with the battery range optimization value.

In another embodiment wherein the control system is configured to, when generating the range optimization action, control a user interface to advise a user whether the electric marine drive is operating at an optimized propulsion output.

BRIEF DESCRIPTION OF THE DRAWINGS

The present disclosure includes the following Figures.

FIGS. 4-6 illustrate exemplary methods for controlling at least one battery-powered electric marine drive configured to propel a planing marine vessel in accordance with embodiments of the present disclosure.

DETAILED DESCRIPTION

The present disclosure relates to controlling at least one battery-powered electric marine drive configured to propel a planing marine vessel, including for semi-autonomous and autonomous control of propulsion systems, as well as for assisting an operator desiring to maximize power efficiency of the propulsion system. The inventors have recognized that operating a marine vessel off plane requires large amounts of power consumption, which reduces the battery range of the marine vessel without adding any speed compared to a marine vessel on plane. Conversely, increasing the vessel speed significantly above the planing speed is also inefficient, where more power-per-unit-distance is utilized to propel the vessel at high speed compared to lower planing speeds. Moreover, sometimes changes in the weight of the marine vessel, weather conditions, and/or sharp directions of change may increase the required power consumption to maintain a particular vessel speed. Additionally, the planing status of the vessel may be easily disrupted at or near a precipice vessel speed for planing, such as the lowest vessel speed where the vessel is on plane. For example, environmental or steering events may cause the vessel to fall off plane. Thus, the marine vessel may not stay on plane if the speed is too close to the lower limit of an on-plane state, wherein small deviations in speed or direction, such as a sharp turn or hitting a wave, may be sufficient to bring the marine vessel off plane.

Given those challenges, the inventors developed the disclosed propulsion system and method configured to determine the optimal speed to maximize the battery range of the marine vessel. Propulsion efficiency is measured by comparing one or more propulsion output values to a battery range optimization value. The comparison generates a range optimization action, wherein the action adjusts or recommends adjustment of the propulsion output of the marine drive(s) to a planing speed that provides optimized propulsion output efficiency. The system may be configured to automatically control the electric marine drive to maintain the vessel at a minimum sustainable planing speed for the planing marine vessel. This minimum sustainable planing speed may include a speed that is able to maintain the planing marine vessel in an on-plane state without falling off plane for turns or other slight changes in speed or direction and to maintain the vessel on plane in given environmental conditions.

Figure 1:
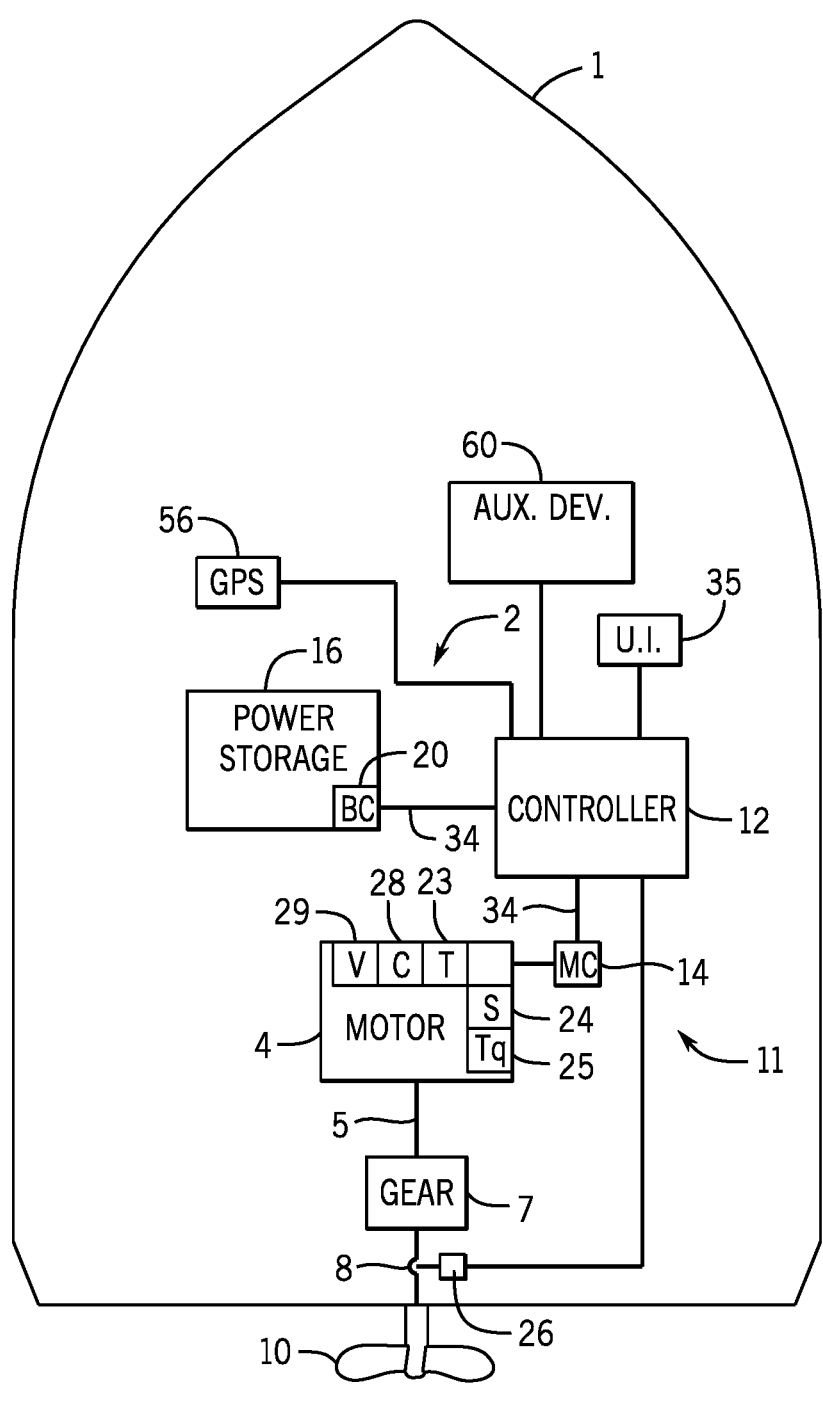
FIG. 1 is a schematic depiction of a marine vessel having an exemplary electric marine propulsion system according to one embodiment of the present disclosure.
Figure 2:
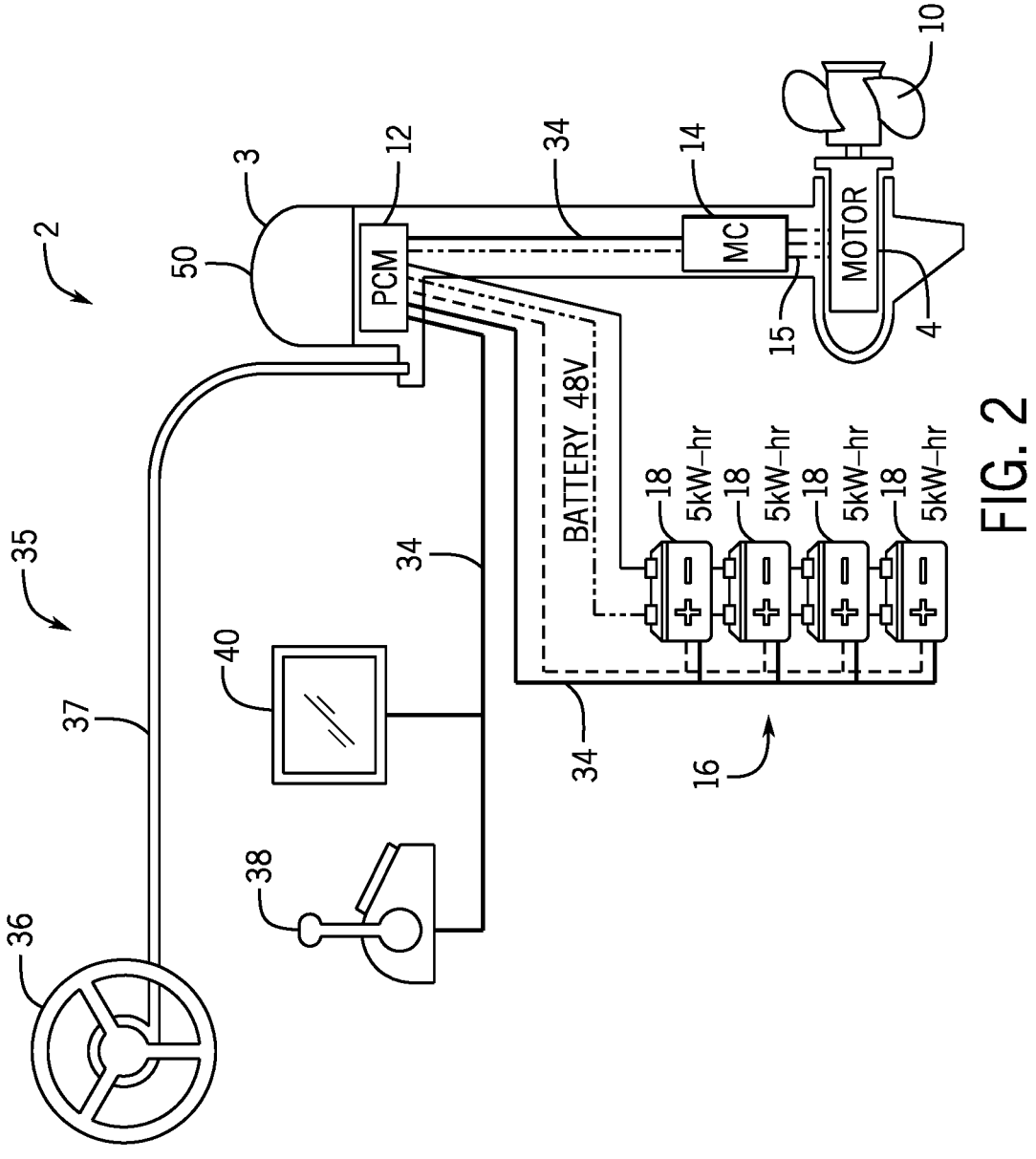
FIG. 2 is a schematic of another exemplary electric marine propulsion system in accordance with the present disclosure.

FIG. 1 depicts an exemplary embodiment of a marine vessel 1 having an electric marine propulsion system 2 configured to propel the marine vessel in a direction instructed by an operator via a steering control system, or by a guidance system configured to automatically control steering of the marine vessel to steer the vessel toward a predetermined location or global position. Referring also to FIG. 2, the electric propulsion system 2 includes at least one electric marine drive 3 having an electric motor 4 configured to propel the marine vessel 1 by rotating a propeller 10, as well as a power storage system 16, and a user interface system 35. In the depicted embodiment of FIG. 2, the electric marine propulsion system 2 includes an outboard marine drive 3 having an electric motor 4 housed therein, such as housed within the cowl 50 of the outboard marine drive. A person of ordinary skill in the art will understand in view of the present disclosure that the marine propulsion system 2 may include other types of electric marine drives 3, such as inboard drives or stem drives. The electric marine drive 3 is powered by the scalable storage device 16, such as including a bank of batteries 18.

The electric marine propulsion system 2 may include one or a plurality of electric marine drives 3, each comprising at least one electric motor 4 configured to rotate a propulsor, or propeller 10. The motor 4 may be, for example, a brushless electric motor, such as a brushless DC motor. In other embodiments, the electric motor may be a DC brushed motor, an AC brushless motor, a direct drive, a permanent magnet synchronous motor, an induction motor, or any other device that converts electric power to rotational motion. In certain embodiments, the electric motor 4 includes a rotor and a stator in a known configuration.

The electric motor 4 is electrically connected to and powered by a power storage system 16. The power storage system 16 stores energy for powering the electric motor 4 and is rechargeable, such as by collection to shore power when the electric motor 4 is not in use. Various power storage devices and systems are known in the relevant art. The power storage system 16 may be a battery system including one or more batteries or banks of batteries. For example, the power storage system 16 may include one or more lithium-ion (LI) battery systems, each LI battery comprised of multiple battery cells. In other embodiments, the power storage system 16 may include one or more lead-acid batteries, fuel cells, flow batteries, ultracapacitors, and/or other devices capable of storing and outputting electric energy.

The electric motor 4 is operably connected to the propeller 10 and configured to rotate the propeller 10. As will be known to the ordinary skilled person in the relevant art, the propeller 10 may include one or more propellers, impellers, or other propulsor devices and that the term "propeller" may be used to refer to all such devices. In certain embodiments, such as that represented in FIG. 1, the electric motor 4 may be connected and configured to rotate the propeller 10 through a gear system 7 or a transmission. In such an embodiment, the gear system 7 translates rotation of the motor output shaft 5 to the propeller shaft 8 to adjust conversion of the rotation and/or to disconnect the propeller shaft 8 from the drive shaft 5, as is sometimes referred to in the art as a "neutral" position where rotation of the drive shaft 5 is not translated to the propeller shaft 8. Various gear systems 7, or transmissions, are well known in the relevant art. In other embodiments, the electric motor 4 may directly collect to the propeller shaft 8 such that rotation of the drive shaft 5 is directly transmitted to the propeller shaft 8 at a constant and fixed ratio.

The power storage system 16 may further include a battery controller 20 configured to monitor and/or control aspects of the power storage system 16. The battery controller 20 may further be configured to receive information from current, voltage, and/or other sensors within the power storage system 16, such as to receive information about the voltage, current, and temperature of each battery cell or group of battery cells within the power storage system 16. For example, the battery controller 20 may receive inputs from one or more sensors within the power storage system 16, such as one or more voltage, current, and temperature sensors within a housing for the power storage system 16. Voltage sensors may be configured to sense voltage within the battery (such as cell voltage sensors configured to sense the voltage of individual cells or groups of cells in a LI battery) and one or more temperature sensors may be configured to sense a temperature within a housing of the power storage device where one or more batteries or other storage elements are located. The battery controller 20 or other controller in the system is configured to calculate a charge level, such as a state of charge, of the power storage system 16.

A control system 11 controls the electric marine propulsion system 2, wherein the control system 11 may include a plurality of control devices configured to cooperate to provide the method of controlling the electric marine propulsion system described herein. For example, the control system 11 includes a central controller 12, the battery controller 20, and one or more motor controllers, trim controllers, steering controllers, etc. communicatively connected, such as by a communication bus. A person of ordinary skill in the art will understand in view of the present disclosure that other control arrangements could be implemented and are within the scope of the present disclosure, and that the control functions described herein may be combined into a single controller or divided into any number of a plurality of distributed controllers that are communicatively connected.

Each controller may comprise a processor and a storage device, or memory, configured to store software and/or data utilized for controlling and/or tracking operation of the electric propulsion system 2. The memory may include volatile and/or non-volatile systems and may include removable and/or non-removable media implemented in any method or technology for storage of information. The storage media may include non-transitory and/or transitory storage media, including random access memory, read only memory, or any other medium which can be used to store information and be accessed by an instruction execution system, for example. An input/output (I/O) system provides communication between the control system 11 and peripheral devices.

Each electric motor 4 may be associated with a motor controller 14 configured to control power to the electric motor, such as to the stator winding thereof. The motor controller 14 is configured to control the function and output of the electric motor 4, such as controlling the torque outputted by the motor, the rotational speed of the motor 4, as well as the input current, voltage, and power supplied to and utilized by the motor 4. In one arrangement, the motor controller 14 controls the current delivered to the stator windings via the leads 15, which input electrical energy to the electric motor to induce and control rotation of the rotor. In certain embodiments, various sensing devices 23-25, 26, and 28-29, may be configured to communicate with a local controller, such as the motor controller 14 or battery controller 20, and in other embodiments the sensors 23-25, 26, and 28-29 may communicate with the central controller 12 and one or more of the motor controller 14 and or battery controller 20 may be eliminated. A GPS system 56 may also be configured to determine a current global position of the vessel, track vessel position over time, and/or determine vessel speed and direction of travel, and to provide such information to the controller 12. Alternatively or additionally, vessel speed may be measured by a speed-over-water sensor such as a pitot tube or a paddle wheel and such information may be provided to the controller 12. Controllers 12, 14, 20 (and/or the various sensors and systems) may be configured to communicate via a communication bus such as a CAN bus or a LIN bus, or by single dedicated communication links between controllers 12, 14, 20.

Sensors may be configured to sense the power, including the current and voltage, delivered to the motor 4. For example, a voltage sensor 29 may be configured to sense the input voltage to the motor 4 and a current sensor 28 may be configured to measure input current to the motor 4. Accordingly, power delivered to the motor 4 can be calculated and such value can be used for monitoring and controlling the electric propulsion system 2, including for monitoring and controlling the motor 4. In the depicted example, the voltage sensor 29 and current sensor 28 may be communicatively collected to the motor controller 14 to provide measurement of the voltage supplied to the motor and current supplied to the motor. The motor controller 14 is configured to provide appropriate current and or voltage to meet the demand for controlling the motor 4. For example, a demand input may be received at the motor controller 14 from the central controller 12, such as based on an operator demand at a helm input device, such as the throttle lever 38. In certain embodiments, the motor controller 14, current sensor 28, and voltage sensor 29 may be integrated into a housing of the electric motor 4, in other embodiments the motor controller 14 may be separately housed.

Various other sensors may be configured to measure and report parameters of the electric motor 4. For example, the electric motor 4 may include means for measuring and or determining the torque, rotation speed (motor speed), current, voltage, temperature, vibration, or any other parameter. In the depicted example, the electric motor 4 includes a temperature sensor 23 configured to sense a temperature of the motor 4, a speed sensor 24 configured to measure a rotational speed of the motor 4 (motor RPM), and a torque sensor 25 for measuring the torque output of the motor 4. A propeller speed sensor 26 may be configured to measure a rotational speed of the propeller 10. For example, the propeller speed sensor 26 and/or the motor speed sensor 24 may be a Hall Effect sensor or other rotation sensor, such as using capacitive or inductive measuring techniques. In certain embodiments, one or more of the parameters, such as the speed, torque, or power to the electric motor 4, may be calculated based on other measured parameters or characteristics. For example, the torque may be calculated based on power characteristics in relation to the rotation speed of the electric motor, for example.

The central controller 12, which in the embodiment shown in FIG. 2 is a propulsion control module (PCM), communicates with the motor controller 14 via communication link 34, such as a CAN bus. The controller also receives input from and/or communicates with one or more user interface devices in the user interface system 35 via the communication link, which in some embodiments may be the same communication link as utilized for communication between the controllers 12, 14, 20 or may be a separate communication link. The user interface devices in the exemplary embodiment include a throttle lever 38 and a display 40. In various embodiments, the display 40 may be, for example, part of an onboard management system, such as the VesselView™ by Mercury Marine of Fond du Lac, Wis. A steering wheel 36 is provided, which in some embodiments may also communicate with the controller 12 in order to effectuate steering control over the marine drive 3, which is well-known and typically referred to as steer-by-wire arrangements. In the depicted embodiment, the steering wheel 36 is a steer arrangement where the steering wheel 36 is connected to a steering acnlator that steers the marine drive 3 by a steering cable 37. Other steer arrangements, such as various steer-by-wire arrangements, are well-known in the art and could alternatively be implemented.

The various parameters of the electric propulsion system are utilized for providing user-controlled or automatically effectuated vessel power control functionality appropriate for optimizing power usage. The system may be configured to control power usage by the electric propulsion system 2 to prevent running out of power prior to traveling the user-set distance and to continue at least low speed propulsion of the marine vessel sufficient to complete the distance. The system may be configured to operate in a variety of user-selectable power modes, including a distance mode where the control system 11 operates to impose limits on motor output or power consumption enable the marine vessel to travel the user-set distance without recharging the power storage system.

The power storage system 16 may further be configured to power auxiliary devices 60 on the marine vessel that are not part of the propulsion system 2. For example, the auxiliary devices may include a bilge pump, a cabin lights, a stereo system or other entertainment devices on the vessel, a water heater, a refrigerator, an air conditioner or other climate/comfort control devices on the vessel, communication systems, navigation systems, or the like. Some or all of these accessory devices are sometimes referred to as a "house load" and may consume a substantial amount of battery power.

The system may present the user with a plurality of power mode options selectable by a user, which may include options for selection of an efficiency control mode that provides control functionality to increase and/or maximize the propulsion efficiency of the propulsion system and the distance that the vessel can travel on a given charge level of the battery. The efficiency control mode may be engaged based on user input, such as a button press or mode selection input at a helm display 40 or other input element at the helm or elsewhere. In some embodiments of the efficiency control mode, the control system may be configured to automatically control propulsion output of the marine drive 3 to optimize battery range. In such an embodiment, additional user input may be required in addition to selection input selecting the efficiency control mode, wherein the additional user input triggers automatic propulsion control to increase or maximize propulsion efficiency, as described herein. For example, user input to engage the efficiency control mode may include input selecting the mode followed by placing a throttle lever 38 associated with the electric marine drive 3 at a wide-open-throttle position to activate the automatic propulsion control in the mode. Alternatively, the efficiency control mode may be automatically selected and engaged by the control system 11, such as based on the charge level of the power storage system 16, the distance of the marine vessel from shore or from a predetermined location, the energy consumption history of the electric marine drive 3, and/or other factors.

Figure 3:
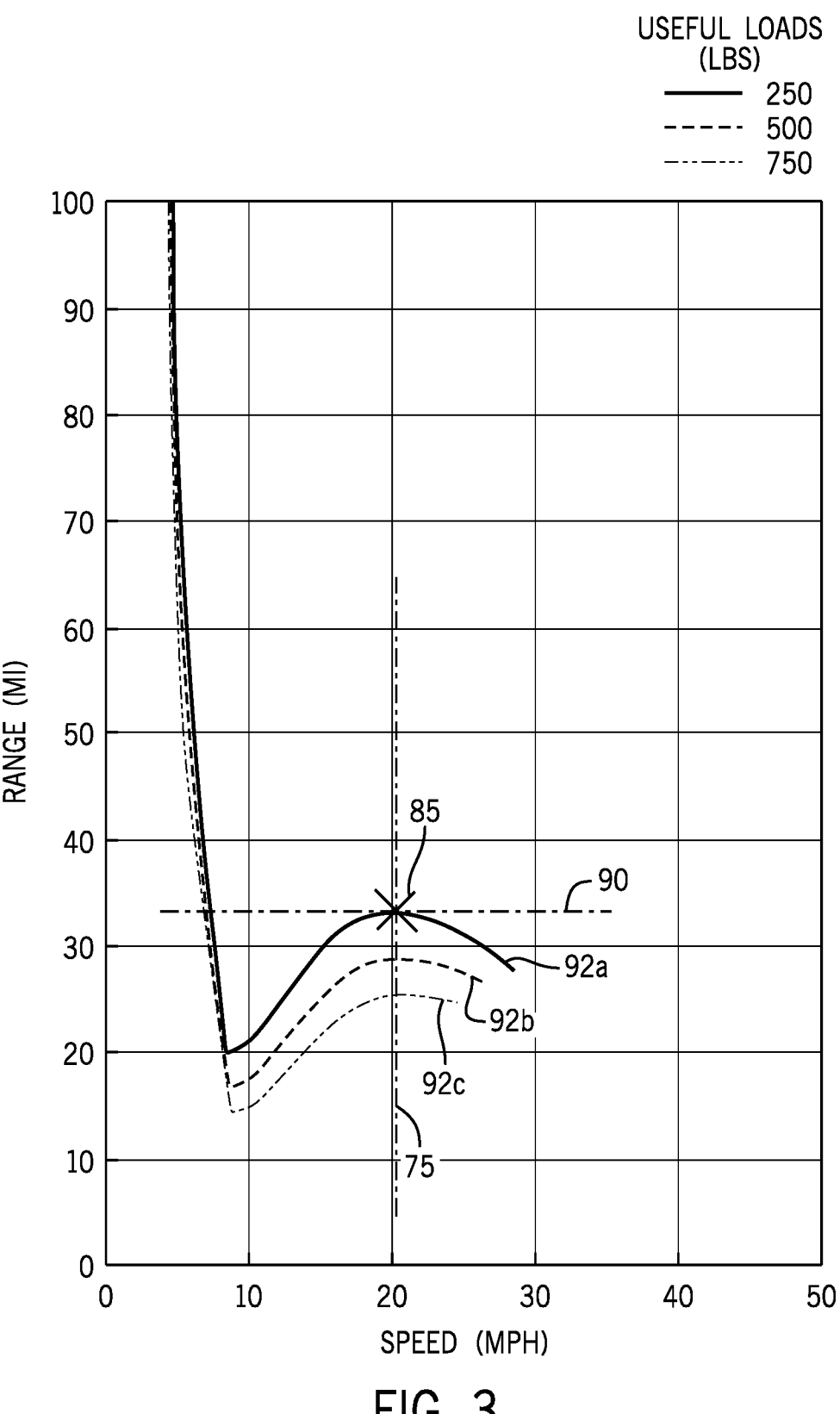
FIG. 3 illustrates battery range optimization values for an exemplary electric marine propulsion system at a range of vessel speeds according to one embodiment of the present disclosure.

Referring now to FIG. 3, the control system may determine a battery range optimization value 85 of an exemplary electric marine propulsion system. In one embodiment, the control system may receive a control command to engage an efficiency control mode, wherein the efficiency control mode is configured to provide propulsion efficiency of the electric marine drive 3 at a threshold planing speed 75 of the marine vessel. The planing speed 75 of the marine vessel may be the speed required to keep the marine vessel on plane, or level on the surface of the water, as the marine vessel moves at the predetermined speed. Different vessels have different threshold planing speeds, such as based on their hull shape, hull type, length, width, weight, and propulsion arrangement. Moreover, depending on the vessel configuration and construction, the threshold planing speed 75 and the most efficient planing speed 75 for a particular vessel may be impacted by variable conditions, such as current vessel weight, weight distribution on the vessel, and environmental conditions such as wind, waves, and current.

Thus, different battery range optimization values may be set for different marine vessels, and the disclosed system may be configurable accordingly. Moreover, in various embodiments, the battery range optimization value(s) 85 may be fixed, configured value(s) stored and utilized by the control system, or the control system may be configured to adapt one or more of the battery range optimization value(s) 85 utilized for controlling the electric marine drive in the efficiency control mode.

Determination of the planing speed 75 by the control system may be executed by the control system using any of a number of methods. In one embodiment, the control system may access at least one database stored in memory that contains information regarding one or more previous propulsion output values, such as velocity magnitudes, for launch, on plane, and off plane state. The database may store a propulsion output value being a previously determined battery range optimization value 85. Alternatively or additionally, the database may store a static propulsion output value that represents a starting point for a routine executed by the control system to determine a current battery range optimization value 85 for the vessel. The control system may control at least one battery-powered electric marine drive 3 to accelerate the marine vessel until a propulsion output value reaches the stored battery range optimization value 85, and thereafter control the marine drive 3 so as to maintain at least a threshold consistency in propulsion efficiency. For example, the stored battery range optimization value 85 may be a vessel speed (such speed over ground measured by GPS or speed over water measured by a vessel speed sensor) and monitored propulsion output value may be a corresponding type of vessel speed value. In other embodiments, the propulsion output value and the battery range optimization value 85 each may include a motor rpm, a motor current, and/or a motor torque. In particular, the stored battery range optimization value 85 may include a vessel speed, a motor rpm, a motor current, and/or a motor torque that produces a greatest battery range value for the electric marine drive propelling the planing marine vessel, which may be a static stored value or may be adapted over time based on optimization determinations that account for current operating conditions of a vessel.

In at least one embodiment, the control system may identify a change in one or more propulsion output values as an indication that the marine vessel is on plane. When on plane, a marine vessel may travel faster for the same thrust output as a vessel off plane due to the lower water resistance associated with a greater portion of the planing hull being above the surface of the water. As illustrated in FIG. 3, as the marine vessel accelerates toward its planing speed 75, the power consumption and torque output decreases in proportion to speed of the vessel until the vessel approaches its threshold planing speed 75. Thus, as the vessel speeds up and the hull rises out of the water, the efficiency increases. As the marine vessel transitions to an on-plane state, the resistance of the water on the marine vessel levels out and a peak efficiency is reached where power consumption of the marine drive 3 per unit distance is minimized. Thus, the calculated battery range value increases during acceleration to the planing speed and is maximized once the vessel is on plane. Beyond that point, the efficiency decreases as the propulsion output increases. Referring again to FIG. 3, the battery range optimization value 85 represents the propulsion output value—here, the vessel speed value 75—providing the highest range value 90. At increased vessel speeds beyond that point, the range decreases.

In one embodiment, the control system may determine the battery range optimization value by monitoring a battery range (for the at least one electric marine drive) at a plurality of propulsion outputs. Comparing the battery ranges, the control system may determine the greatest battery range value. The greatest battery range value may be used by the control system to determine the battery range optimization value. In one embodiment, the control system may determine the propulsion efficiency of the greatest battery range value by comparing the propulsion output values at the battery range optimization value. If the propulsion output values are higher comparatively than the propulsion output values of other battery ranges, the control system may determine that, although the battery range is the greatest, the propulsion efficiency at that speed is not the battery range optimization value, such as if the marine vessel is moving at a lower speed, where the battery range may be high but the propulsion output values are also excessively high due to moving the marine vessel through water with the majority of the planing hull submerged.

As illustrated in FIG. 3, the load on the marine vessel may impact the highest range value 90 achievable by the propulsion system. The graphed lines in FIG. 3 show battery range versus speed for marine vessels having various load sizes. The various loads 92*a*, 92*b*, 92*c* may reflect various vessel weights, the number of people present on the marine vessel, the fill level of gas tanks, or the towing of a tow sport participant, as non-limiting examples. In one embodiment, the highest battery range value 90 may decrease with load while the planing speed 75 required for optimized propulsion output efficiency remains about the same.

In one embodiment, the control system may store one or more optimized propulsion output values associated with the marine vessel being on plane, such as a vessel speed, a motor rpm, a motor current, and/or a motor torque in a databased accessible by memory when either the planing speed is identified or when indicated by user input, such as by selecting a "save" option after the marine vessel is on plane. User input received by the control system may store the optimized propulsion output value(s) in circumstances when the electric propulsion system is providing feedback to the user advising whether the electric marine drive is operating at an optimized propulsion output consistent with the battery range optimization value. In this embodiment, where the user controls the speed of the marine vessel, storing optimized propulsion output value(s) and/or a battery range optimization value associated with the marine vessel being on plane, may be received by the control system as user input. Alternatively, the control system may automatically save the optimized propulsion output value(s) and/or a battery range optimization value associated with the marine vessel being on plane either periodically, after a certain amount of time where the marine vessel is on plane, or when the state of the marine vessel changes, such as when the marine vessel becomes off plane after being on plane, as non-limiting examples. When activating the efficiency control mode, the control system may access the database to return the marine vessel to the propulsion output value that was previously associated with achieving an optimized on-plane state, or may be a preset value to serve as a starting point for the control system to locate the current battery range optimization value for a vessel. In another embodiment, the control system may utilize a static present value as the battery range optimization value.

The range optimization action may include automatically adjusting propulsion output of the electric marine drive by the control system, based on the comparison to the battery range optimization value. In such an embodiment, the control system is configured to automatically accelerate the marine vessel to the stored value, which may be a previous battery range optimization value or may be greater than or less than the battery range optimization value. For example, the control system may utilize existing parameters and predetermined settings to accelerate the marine vessel to an on plane state, such as by using smart tow and/or auto trim to define the rate of acceleration to achieve an on-plane state and to optimize trim set points.

In other embodiments, the range optimization action may include instructing a user to adjust the propulsion output based on the comparison to the battery range optimization value. For example, the control system may be configured to generate an alert on a user interface, such as an audio and/or visual alert, advising the user of the optimized planing speed and/or providing instructions for the operator to increase or decrease the propulsion command input (e.g., via a throttle lever or tiller handle) to the marine drive to increase propulsion efficiency.

Once the on plane state is reached, the control system may be configured to locate and/or maintain the current battery range optimization value for the vessel. Where the system is configured for automated propulsion control, a closed loop controller, such as in the PCM 12, may be utilized by the control system to reduce output power to achieve a minimum power consumption while retaining an on-plane state. The minimum power consumption required to maintain an on-plane state may be determined as the control system monitors the battery range or other power efficiency value (e.g., energy per unit distance) over a range of propulsion output values, such as vessel speeds. For example, where the vessel is traveling at a vessel speed greater than the minimum planing speed (or the minimum sustainable paining speed as described below), the control system may be configured to reduce the propulsion output value in predetermined intervals until the range value decreases. Upon identification of a decrease in the calculated range value at a decreased propulsion output (i.e., an increase in the energy usage per unit distance), the control system may increase the speed of the marine vessel sufficiently to return the propulsion output value to the previous, more efficient, propulsion output value. The battery range optimization value may be set accordingly.

Thereafter, if the range value suddenly increases (such as by a threshold amount associated with the vessel falling off plane), the propulsion output may be progressively increased by predetermined amounts at predetermined time intervals until the on plane state is maintained for a preset time. The battery range optimization value is then increased accordingly. In other embodiments, the battery range optimization value may be determined by starting the vessel below the expected minimum sustainable plaining speed and increasing the propulsion output value by predetermined increments until the minimum sustainable planing speed is achieved.

In some embodiments, the determined battery range optimization value may be stored and utilized as a starting point for controlling propulsion in a subsequent control session in the efficiency control mode. In subsequent uses of the efficiency control mode, the control system may compare the current propulsion output value with a propulsion output value associated with the previous battery range optimization value. In one embodiment, the control system may, after comparison, store the battery range optimization value indicating the adjusted optimized propulsion output efficiency value for future reference. Thus, some or all of the battery range optimization value(s) utilized by the control system may change over time, or even from one use of the efficiency control mode to the next. Changes may depend on changes to the configuration of the marine vessel, such as additional weight added by additional people or equipment. Additional weight may require additional power consumption, thereby changing the battery range optimization value. In some embodiments, the control system may be configured to calculate a filtered battery range optimization value so that the stored value updates over time but does not change drastically from one session to the next and is not overly influenced by abnormal operating conditions.

In one embodiment, the control system may recalculate the battery range optimization value periodically, rather than every implementation of the efficiency control mode. As described above, the control system may be configured to apply a filter during the update, thereby to calculate a filtered battery range optimization value, so that the updated stored value is not overly influenced by abnormal operating conditions. Similarly, determination of the battery range optimization value may only begin if the current propulsion output value is within a predetermined threshold of the previous battery range optimization value. The threshold range may be a numeric limit or the threshold may be a percentage of the battery range optimization value, such within 15% of the previous battery range optimization value.

Once the battery range optimization value is reached/identified, the control system acts to maintain that efficiency level and generates one or more range optimization actions accordingly. In one embodiment, the control system may automatically control the propulsion output of the marine drive(s) to remain with range of the battery range optimization value (unless conditions change and the efficiency decreases indicating that the vessel has fallen off plane).

Alternatively, the battery range optimization value may be utilized by the control system to automatically a limit on the speed and/or the RPM of a marine vessel. In such as embodiment, the control system may be configured to effectuate an operator's propulsion command input up to where the propulsion output reaches the battery range optimization value, such as where marine vessel reaches the speed and/or RPM limit. For example, if the control system is operating with a battery range optimization value of 20% of the propulsion capacity (e.g., 20% demand) or 1000 RPM, then the propulsion output value may increase based on user input until 20% demand or 1000 RPM is reached, but will not increase further regardless of receiving user input requesting greater demand or RPM. Alternatively or additionally, the battery range optimization value allows unrestricted acceleration while maintain a vessel speed limit that optimizes the propulsion output efficiency.

In another embodiment, generating the range optimization action may include controlling the user interface to advise a user whether the electric marine drive is operating at an optimized propulsion output consistent with the battery range optimization value. In this embodiment, control system is configured to control the marine drive(s) based on and to effectuate the user's propulsion command, and the control system may advise the user when the speed of the marine vessel is either within range of the battery range optimization value or not. The control system may be configured to notify the user that the current speed and/or RPM of the marine vessel is equivalent to the battery range optimization value so, by maintaining the same speed and/or RPMs, the propulsion output efficiency can be maintained. Similarly, the control system may be configured to generate an alert instructing a user to increase or decrease vessel speed in order to stay within range of the battery range optimization value, Alternatively or additionally, the display on the user interface may display a target trim point, trim angle, and/or engine RPM associated with the battery range optimization value. In some embodiments, when the control system determines the current trim point, trim angle, and/or RPM are within a predetermined RPM and/or trim threshold, the display may turn the screen green versus red, as an example, to indicate to the operator that the current propulsion output value is within the battery/propulsion range associated with the battery range optimization value.

Figure 4:
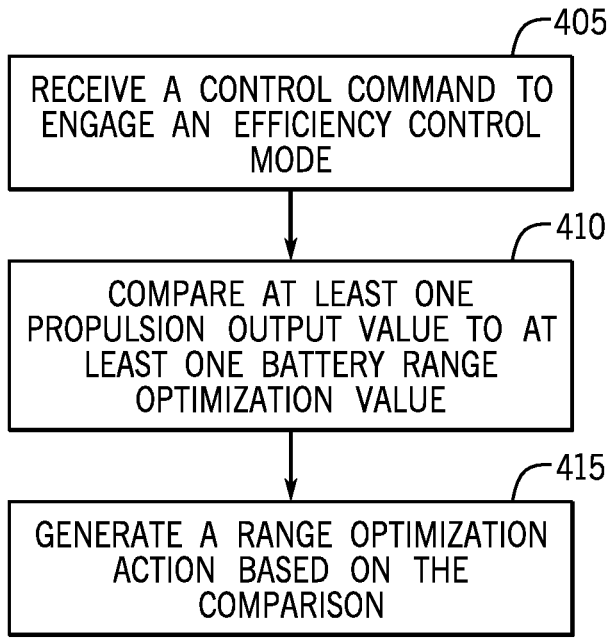

FIG. 4 illustrates an exemplary method for controlling at least one battery-powered electric marine drive configured to propel a planing marine vessel. At 405, a control command to engage an efficiency control mode is received by the control system. For example, the control command may be a user input to engage and/or activate the efficiency control mode. At 410, at least one propulsion output value is compared by the control system to at least one battery range optimization value. The battery range optimization value may be a static value accessed by the control system, or may be a value determined for the particular operation session. In various implementations, the propulsion output value(s) and the battery range optimization value(s) may each include corresponding vessel speed, motor rpm, motor current, and/or motor torque values to enable appropriate comparison. At 415, a range optimization action is generated by the control system based on the comparison. In one embodiment, the range optimization action may include automatically controlling propulsion output by the at least one marine drive, wherein the control system may use battery range optimization value to limit the speed of the marine vessel while the efficiency control mode is activated. Alternatively or additionally, the range optimization action may include automatically controlling a trim position of the electric marine drive to provide propulsion efficiency of the electric marine drive at the planing speed of the marine vessel. Controlling the trim position of the electric marine drive may include automatically controlling a trim actuator to move the electric marine drive to a predetermined trim position once the marine vessel is on plane. The predetermined trim position may improve the battery range optimization value as the propulsion system requires less effort from the marine drives to maintain the planing speed.

FIG. 5 illustrates an exemplary method for controlling at least one battery-powered electric marine drive configured to propel a planing marine vessel. At 505, a control command to engage an efficiency control mode is received by the control system. At 510, the battery range optimization value is determined by the control system based on a battery range for the at least one electric marine drive. In one embodiment, the battery range optimization value may be determined based on a plurality of battery ranges. At 515, at least one propulsion output value is compared by the control system to at least one battery range optimization value. At 520, the control system automatically controls the at least one electric marine drive such that the propulsion output value is maintained within a predetermined range of the battery optimization value. In one embodiment, the range optimization action includes maintaining the propulsion output value within the predetermined range of the battery range optimization value until user input is received to disengage the efficiency control mode. At 525, the control system automatically controls a trim position of the electric marine drive. The trim position is controlled to provide propulsion efficiency of the electric marine drive at the planing speed of the marine vessel. In one embodiment, controlling the trim position includes controlling a trim actuator to move the electric marine drive to a predetermined trim position once the marine vessel is on plane. Alternatively or additionally, the control system may be configured to control the trim actuator to a trim position based on vessel speed, RPM, or some of the speed parameter. Methods and systems for controlling trim based on a speed condition are illustrated in U.S. Pat. Nos. 7,416,456, 9,290,252, and 9,745,036, which are hereby incorporated by reference in their entireties.

At 530, the control system controls a user interface to advise a user whether the electric marine drive is operating at an optimized propulsion output. In one embodiment, the control system may be configured to generate an alert on a user interface advising the user of the optimized planing speed and/or providing instructions for the operator to increase or decrease the propulsion command input to the marine drive to increase propulsion efficiency. In another embodiment, the control system is configured to change the display screen green versus red, as an example, to indicate to the operator that the current propulsion output value is within the battery/propulsion range associated with the battery range optimization value.

Figure 6:
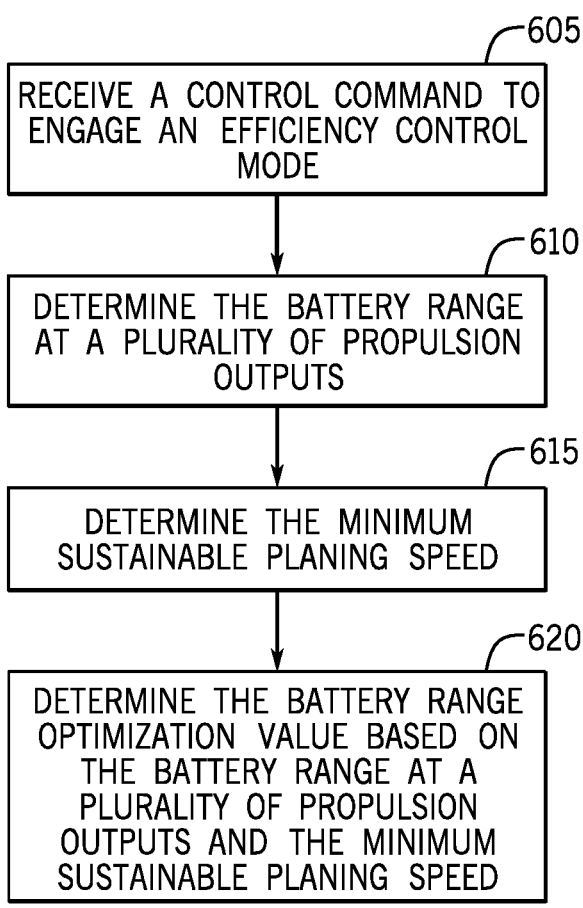

FIG. 6 illustrates an exemplary method for controlling at least one battery-powered electric marine drive configured to propel a planing marine vessel. At 605, the control system receives a control command to engage an efficiency control mode. In one embodiment, the efficiency control mode is configured to provide propulsion efficiency of the electric marine drive at a planning speed of the marine vessel. In another embodiment, the efficiency control mode may be terminated or paused if the control system receives user input indicating intentional deceleration, such as adjusting the throttle lever. At 610, the battery range is determined by the control system at a plurality of propulsion outputs.

At 615, the minimum sustainable planing speed is determined by the control system. In one embodiment, the minimum sustainable planing speed may be determined as the control system monitors the battery range or other power efficiency value over a range of propulsion output values, such as vessel speeds. This may include monitoring the calculated battery range value to assess that the vessel is maintained on plane and increasing the propulsion output value if the planing state is not adequately maintained (falling off plane is inefficient). In another embodiment, determining a minimum sustainable planing speed may include adding a predetermined buffer amount or percentage to an initially determined minimum planing speed so as to avoid the marine vessel entering an unstable planing state where the marine vessel may fall off plane when performing routine maneuvers, such as when hitting a small wave or turning. At 620, the control system determines the battery range optimization value based on the battery range at a plurality of propulsion outputs and the minimum sustainable planing speed.

This written description uses examples to disclose the invention, including the best mode, and to enable any person skilled in the art to make and use the invention. Certain terms have been used for brevity, clarity and understanding. No unnecessary limitations are to be inferred therefrom beyond the requirement of the prior art because such terms are used for descriptive purposes only and are intended to be broadly construed.

What is claimed is:

1. A method of controlling at least one battery-powered electric marine drive configured to propel a planing marine vessel, the method comprising:

receiving a control command to engage an efficiency control mode configured to provide propulsion efficiency of the electric marine drive at a planing speed of the marine vessel;

comparing at least one propulsion output value for the electric marine drive to at least one battery range optimization value indicating optimized propulsion output efficiency; and generating a range optimization action based on the comparison.

2. The method of claim 1, wherein the control command to engage the efficiency control mode is a user input; and wherein the range optimization action includes automatically adjusting propulsion output of the electric marine drive based on the comparison to the at least one battery range optimization value.

3. The method of claim 2, wherein the user input to engage the efficiency control mode includes placing a throttle lever associated with the electric marine drive at a wide-open-throttle position.

4. The method of claim 1, wherein the at least one propulsion output value and the at least one battery range optimization value each include a vessel speed, a motor rpm, a motor current, and/or a motor torque.

5. The method of claim 1, wherein the at least one battery range optimization value includes a vessel speed, a motor rpm, a motor current, and/or a motor torque that produces a greatest battery range value for the electric marine drive propelling the planing marine vessel.

6. The method of claim 1, further comprising, prior to comparing the at least one propulsion output value to the at least one battery range optimization value, determining the at least one battery range optimization value based on a battery range for the electric marine drive at a plurality of propulsion outputs.

7. The method of claim 1, wherein generating the range optimization action includes automatically controlling the electric marine drive such that the propulsion output value is maintained within a predetermined range of the at least one battery range optimization value.

8. The method of claim 7, wherein generating the range optimization action includes maintaining the propulsion output value within the predetermined range of the at least one battery range optimization value until user input is received to disengage the efficiency control mode.

9. The method of claim 1, wherein, in the efficiency control mode, a control system is configured to automatically control the electric marine drive to maintain the vessel at a minimum sustainable planing speed for the planing marine vessel.

10. The method of claim 1, wherein generating the range optimization action includes automatically controlling a trim position of the electric marine drive to provide propulsion efficiency of the electric marine drive at the planing speed of the marine vessel.

11. The method of claim 10, wherein controlling the trim position of the electric marine drive includes automatically controlling a trim actuator to move the electric marine drive to a predetermined trim position once the marine vessel is on plane.

12. The method of claim 1, wherein generating the range optimization action includes controlling a user interface to advise a user whether the electric marine drive is operating at an optimized propulsion output consistent with the at least one battery range optimization value.

13. An electric propulsion system for a planing marine vessel, the system comprising:

an electric marine drive powered by a battery;

a control system configured to:

receive a control command to engage an efficiency control mode configured to provide propulsion efficiency of the electric marine drive at a planning speed of the marine vessel;

compare at least one propulsion output value for the electric marine drive to at least one battery range optimization value indicating optimized propulsion output efficiency; and generate a range optimization action based on the comparison.

14. The system of claim 13, wherein the at least one propulsion output value and the at least one battery range optimization value each include a vessel speed, a motor rpm, a motor current, and/or a motor torque.

15. The system of claim 13, wherein the at least one battery range optimization value includes a vessel speed, a motor rpm, a motor current, and/or a motor torque that produces a greatest battery range value for the electric marine drive propelling the planing marine vessel.

16. The system of claim 13, wherein the control system is further configured to, prior to comparing the at least one propulsion output value to the at least one battery range optimization value, determine the at least one battery range optimization value based on a battery range for the electric marine drive at a plurality of propulsion outputs.

17. The system of claim 13, wherein the control system is configured to, when generating the range optimization action, automatically control the electric marine drive such that the propulsion output value is maintained within a predetermined range of the at least one battery range optimization value.

18. The system of claim 17, wherein the control system is configured to, when generating the range optimization action, maintain the propulsion output value within the predetermined range of the at least one battery range optimization value until user input is received to disengage the efficiency control mode.

19. The system of claim 13, wherein, in the efficiency control mode, the control system is configured to automatically control the electric marine drive to maintain the vessel at a minimum sustainable planing speed for the planing marine vessel.

20. The system of claim 13, wherein the control system is configured to, when generating the range optimization action, automatically control a trim position of the electric marine drive to provide propulsion efficiency of the electric marine drive at the planing speed of the marine vessel.

21. The system of claim 20, wherein the control system is configured to, when controlling the trim position of the electric marine drive, automatically control a trim actuator to move the electric marine drive to a predetermined trim position once the marine vessel is on plane.

22. The system of claim 13, wherein the control system is configured to, when generating the range optimization action, control a user interface to advise a user whether the electric marine drive is operating at an optimized propulsion output.

* * * * *